J. A. STUBBLEFIELD & R. R. THOMPSON.
RAZOR HANDLE.
APPLICATION FILED SEPT. 21, 1916.
1,214,609.
Patented Feb. 6, 1917.
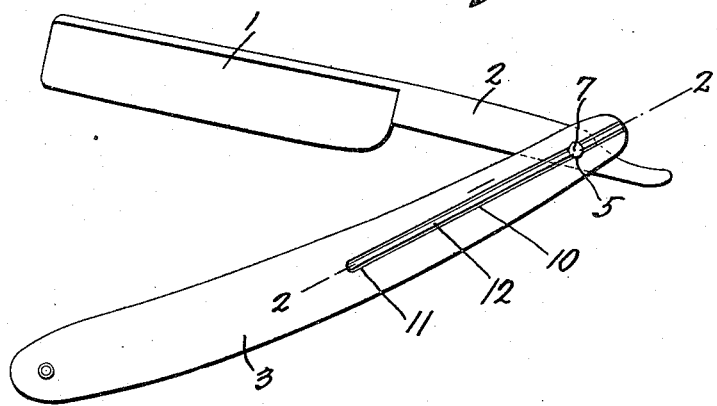
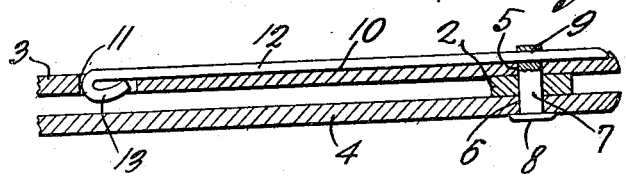
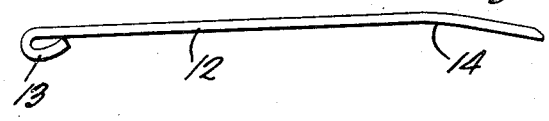
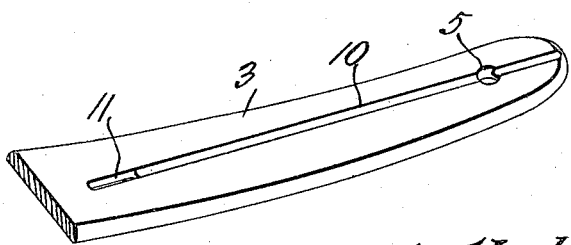
J. A. Stubblefield and
R. R. Thompson, Inventors
Witnesses
by C. A. Snow & Co., Attorneys

UNITED STATES PATENT OFFICE.

JOHN ARTHUR STUBBLEFIELD AND ROSS R. THOMPSON, OF THERMOPOLIS, WYOMING.

RAZOR-HANDLE.

1,214,609.  Specification of Letters Patent.  Patented Feb. 6, 1917.

Application filed September 21, 1916. Serial No. 121,451.

*To all whom it may concern:*

Be it known that we, JOHN A. STUBBLEFIELD and ROSS R. THOMPSON, citizens of the United States, residing at Thermopolis, in the county of Hot Springs, State of Wyoming, have invented a new and useful Razor-Handle, of which the following is a specification.

The present invention appertains to razors, and to kindred implements, and aims to provide novel yet simple, convenient and efficient means for detachably pivoting the blade to the handle, whereby the blade can be readily removed for purpose of sterilization, replacement, sharpening, or the like.

With the foregoing and other objects in view, which will appear as the description proceeds, the invention resides in the combination and arrangement of parts and in the details of construction, hereinafter described and claimed, it being understood that changes in the precise embodiment of the invention, herein disclosed can be made within the scope of what is claimed, without departing from the spirit of the invention.

The invention is illustrated in the accompanying drawings, wherein:—

Figure 1 is a plan view of a razor equipped with the present invention. Fig. 2 is a section on the line 2—2 of Fig. 1. Fig. 3 is a side elevation of the pivot retaining element. Fig. 4 is a fragmental perspective view of one of the handle sections showing the groove for the retaining element.

The razor, as usual, embodies a blade 1 having the shank 2, and a handle composed of the side pieces or sections 3 and 4. The shank 2 is pivoted between the sections of the handle adjacent to one end of the handle, the handle sections being provided with alining apertures 5 and 6, respectively, adjacent said end of the handle and receiving the pivot 7 provided at one end with a head or flange 8 to bear against the handle section 4, said pivot extending through an aperture in the shank 2, whereby the blade can be swung into and out of the handle 2 as usual.

In carrying out the invention, that end of the pivot 7 remote from the head 8 is provided with a transverse or diametrical aperture 9, and the handle section 3 is provided upon its outer surface with a longitudinal groove 10 intersecting the aperture 5. That end of the groove 10 remote from the pivot is provided with an elongated aperture or socket 11. The groove 10 and aperture 11 are readily formed in the handle section 3, to enable the present improvements to be readily embodied in ordinary razors. The pivot retaining element 12 is formed of resilient wire or other suitable stock, and is provided at one end, with a bent back portion providing a loop or holding portion 13. The element 12 is bent, as at 14, adjacent that end remote from the loop 13, and the bend is so located as to be ranged adjacent to the pivot 7 when the loop 13 is adjacent to the aperture 11.

In assembling the parts, after the shank 2 is placed within the end of the handle and the pivot 7 inserted, the bent terminal of the retaining element 12 is inserted through the aperture 9 of the pivot 7, being moved away from the remote end of the handle in the direction of the arrow in Fig. 1. This can be readily done since the body portion of the element 12 can be arranged at an acute angle with the handle while the terminal of the element 12 is being inserted through the aperture 9. Then, by holding the loop 13 by the thumb and finger, the retaining element can be turned, so that it will be practically straightened out, the loop 13 being sprung into the aperture 11. In this connection it is to be noted that the bent terminal extends toward that side of the retaining element toward which the loop 13 extends, whereby when the loop 13 is within the aperture 11, with the retaining element seated in the groove 10, the retaining element will be straightened out. That portion of the retaining element, therefore, which engages the pivot, will tend to spring away from the handle, and the terminals of the retaining element will bear against the handle section 3 whereby the two handle sections will be pressed toward one another to hold the parts snugly in place, to prevent the pivot from being accidentally loosened, and to provide a thoroughly convenient and practical arrangement. The retaining element or spring 12 tends to bow away from the handle, and there is more or less tendency for the retaining element to turn about its axis, but this is prevented by the fitting of the loop or portion 13 within the aperture 11. Moreover, when the element 12 is lifted out of the groove adjacent the aperture 11, said element can be turned, or will turn of itself, and can then readily be withdrawn from the pivot, to enable the pivot to be removed. By this means, the blade can be detached for purpose of replacing it, sterilizing it, sharpening it, or the like.

Having thus described the invention, what is claimed as new is:—

1. A handle having two apertures, a blade pivot extending through one aperture and having an aperture, and a resilient retaining element extending through the aperture of the pivot and bent to assume a bowed shape, the retaining element having a portion to snap into the other aperture of the handle when the retaining element is in a position to bow away from the handle and to prevent the retaining element from turning out of position.

2. A handle having an aperture, a groove intersecting said aperture and a second aperture at one end of said groove, a blade pivot extending through the first mentioned aperture and having an aperture, and a resilient retaining element seatable in said groove having a bend adjacent one end and a loop at its other end, the first mentioned end of the retaining element being insertible through the aperture of the pivot and the loop being engageable in the second mentioned aperture to hold the retaining element in position so that it has a tendency to bow away from the handle.

In testimony that we claim the foregoing as our own, we have hereto affixed our signatures in the presence of two witnesses.

JOHN ARTHUR STUBBLEFIELD.
ROSS R. THOMPSON.

Witnesses:
J. M. HENCH,
JOHN OLNEY.